United States Patent
Sedlak et al.

(10) Patent No.: US 6,615,351 B1
(45) Date of Patent: Sep. 2, 2003

(54) METHOD FOR CHECKING THE AUTHENTICITY OF A DATA MEDIUM

(75) Inventors: Holger Sedlak, Egmating (DE); Franz-Josef Brücklmayr, Kaufering (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/500,415

(22) Filed: Feb. 8, 2000

Related U.S. Application Data

(63) Continuation of application No. PCT/DE98/02147, filed on Jul. 29, 1998.

(30) Foreign Application Priority Data

Aug. 8, 1997 (DE) .......................................... 197 34 507

(51) Int. Cl.⁷ ............................. G06K 7/10; G06F 7/08; G06F 1/24
(52) U.S. Cl. ....................... 713/172; 235/380; 235/382; 235/487; 713/185; 713/186; 713/67; 380/282; 380/25
(58) Field of Search ................................. 713/172, 185, 713/186, 67; 705/67; 380/282; 235/380, 382, 487

(56) References Cited

U.S. PATENT DOCUMENTS

| | | | |
|---|---|---|---|
| 4,907,272 A | | 3/1990 | Hazard et al. |
| 5,917,909 A | | 6/1999 | Lamla |
| 6,230,267 B1 | * | 5/2001 | Richard et al. |

FOREIGN PATENT DOCUMENTS

| | | | |
|---|---|---|---|
| CN | 1032940 C | * | 10/1996 |
| DE | 37 36 882 C2 | | 7/1989 |
| DE | 42 43 888 A1 | | 6/1994 |
| DE | 195 23 009 A1 | | 1/1997 |
| DE | 197 34 507 A1 | | 2/1999 |
| EP | 0 112 461 A1 | | 7/1984 |
| EP | 0 451 024 A1 | | 10/1991 |
| EP | 0 583 709 A1 | | 2/1994 |
| EP | 0 600 646 A2 | | 6/1994 |
| EP | 0 602 643 A2 | | 6/1994 |
| EP | 0 713 197 A1 | | 5/1996 |
| EP | 0 676 073 B1 | * | 11/1996 |
| GB | 2 211 643 A | | 7/1989 |

OTHER PUBLICATIONS

"Chip Cards" (Beutelspacher et al.), ISBN 3–540–54140–3, Springer Verlag.

* cited by examiner

*Primary Examiner*—Gail Hayes
*Assistant Examiner*—Taghi T. Arani
(74) *Attorney, Agent, or Firm*—Laurence A. Greenberg; Werner H. Stemer; Gregory L. Mayback

(57) ABSTRACT

In a method for checking the authenticity of a data medium, in particular a smart card, the encrypted form of a physical feature of the data medium is stored in the data medium. The encrypted form of the feature is transmitted to a terminal, which also measures the physical feature itself. The physical feature is encrypted using a secret key, and is decrypted in the terminal using a public key. Authenticity is confirmed if a comparison of the decrypted feature and the measured feature match. Since the secret key is not contained in either the data medium or the terminal, a high level of security is provided.

2 Claims, 1 Drawing Sheet

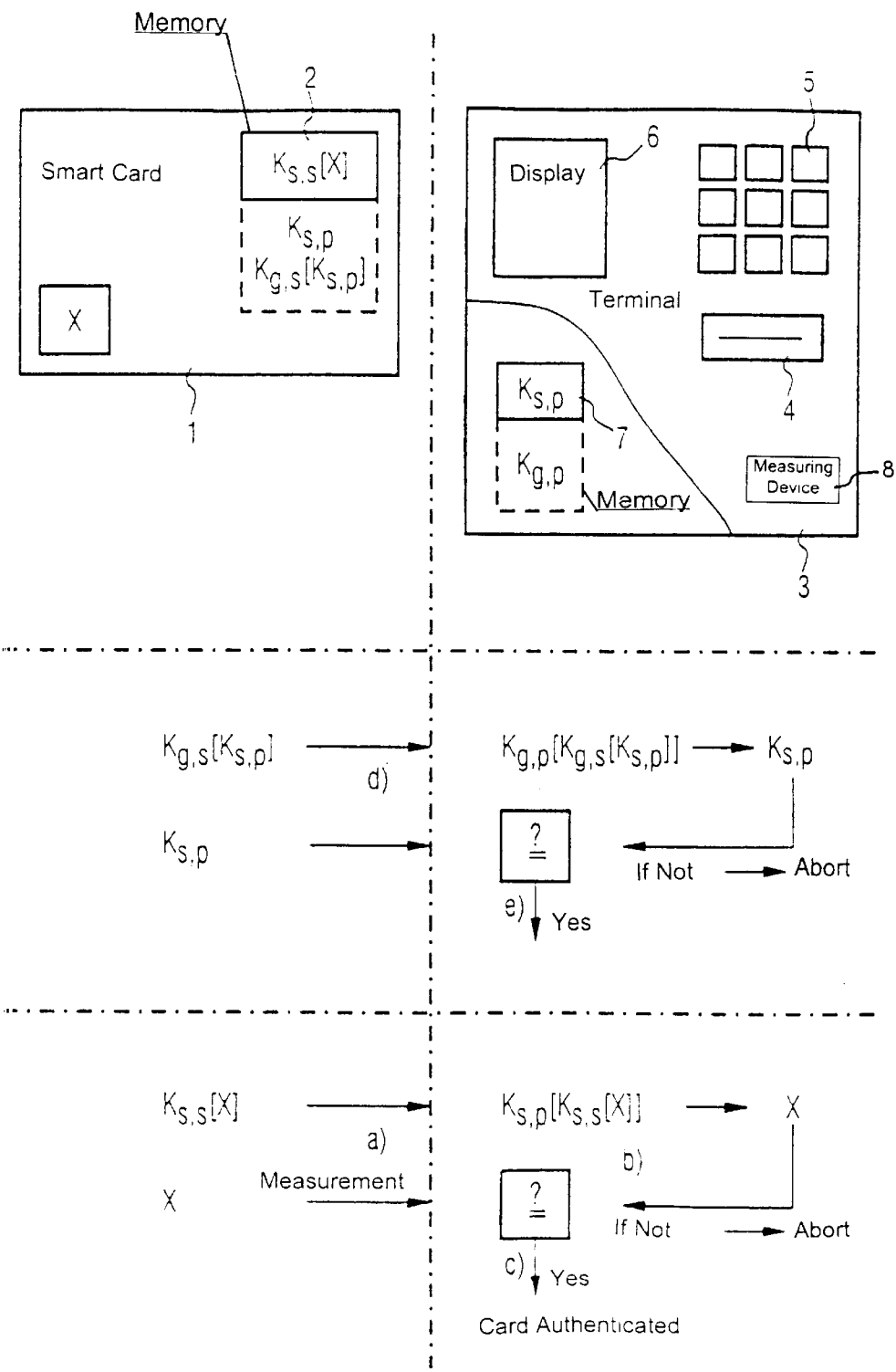

METHOD FOR CHECKING THE AUTHENTICITY OF A DATA MEDIUM

CROSS-REFERENCE TO RELATED APPLICATION

This is a continuation of copending International application PCT/DE98/02147, filed Jul. 29, 1998, which designated the United States.

BACKGROUND OF THE INVENTION

Field of the Invention

The invention relates to a method for checking the authenticity of a data medium, in particular a smart card, which has at least one memory, and a specific, physical feature of the data medium being stored in encrypted form in the memory.

Such a method is known from Published, European Patent Application EP 0 112 461 A1. There, the characteristics of an antenna contained in an identity card are stored in encrypted form in the card. For an authenticity check, this value is compared with a value that results from the currently measured antenna characteristics, for which the encryption algorithm was likewise used.

The Published, European Patent Application EP 0 112 461 A1 does not define whether the comparison and the formation of the code number are carried out in the card or in the terminal. In the first case, this results in the problem that a forged card can always signal a positive comparison result irrespective of the actual comparison result, so that no real authenticity check has to be carried out. In the second case, the measuring terminal must also contain the secret algorithm and the secret number, and this represents a security risk. Furthermore, each terminal must contain the algorithm and the secret number for each card.

Published, European Patent Application EP 0 583 709 A1 likewise describes an authenticity identification method, in is which physical characteristics to be measured are stored in encrypted form, and are later compared with physical characteristics that need to be measured once again, after decryption. An asymmetric encryption and decryption method may also be used in this case. However, this results in the problem of a high level of memory and administration complexity in the terminal for the large number of public keys for the individual data media in a system.

Data media which are intended to be subjected to an authenticity checking method generally have a counter whose count represents a monetary value and thus provide an incentive for copying or simulation. Alternatively, such an incentive results when such data media are used for access control systems or in the area of social security.

A semiconductor chip can be copied identically, so that all the secret numbers and encrypted data, such as the encrypted physical feature, are also contained on the copy without having to understand the detailed circuit configuration, so that there is a major security risk here. However, carrying out the known authenticity checks by use of a physical feature which differs for each data medium and is as complicated as possible, and can thus be simulated only with great difficulty, is a first step towards improved forgery security since, although a criminal can simulate a chip, it is virtually impossible to simulate a card matching this, with the correct physical feature.

For the known methods, the encryption and decryption algorithm as well as the key number to be kept secret or the public key number must be present in each terminal, in order likewise either to encrypt the measured data and to compare the encrypted forms, or to decrypt the encrypted form of the data read from the card, and to compare this with the original data. However, this involves considerable security risks, since this gives a criminal the incentive to misappropriate and to analyze terminals.

SUMMARY OF THE INVENTION

It is accordingly an object of the invention to provide a method for checking the authenticity of a data medium that overcomes the above-mentioned disadvantages of the prior art methods of this general, which offers a high level of security.

With the foregoing and other objects in view there is provided, in accordance with the invention, a method for checking the authenticity of a data medium having at least one memory and a specific physical feature of the data medium being stored in encrypted form in the at least one memory. The specific physical feature is encrypted using a first specific, secret key, in addition, a second specific, public key associated with the first specific, secret key and a form of the second specific public key is encrypted using a third global, secret key resulting in an encrypted second specific, public key being stored in the data medium, the method which includes:

a) reading the second specific, public key and the encrypted second specific, public key from the data medium via a terminal;

b) using a fourth global, public key, stored in the terminal, to calculate a test second key, and comparing the test second key with the second specific, public key previously read;

c) carrying out method steps d) to f) if a match is found between the test second key and the second specific, public key and ending the method steps if no match is found;

d) reading and measuring the encrypted form of the specific physical feature from the at least one memory of the data medium via the terminal resulting in a measured physical feature;

e) using the second specific, public key to calculate a test physical feature via the terminal, and comparing the test physical feature with the measured physical feature; and f) confirming an authenticity of the data medium if the test physical feature matches the measured physical feature, and ending the method steps if the test physical feature does not match the measured physical feature.

In the method according to the invention, a comparison is carried out in the terminal without the secret key having to be provided in the terminal, since asymmetric encryption is used. Asymmetric encryption refers to encryption that is carried out using a key that differs from that used for decryption and, even if the respective other key is known, neither of the two keys can be calculated. The decryption key may be generally known and in general can be found in files that are accessible to anyone—for example from the Internet.

The public key is in this case assigned to a specific, special card system operator, such as credit card companies or banks and insurance companies. The essential feature of the method according to the invention is that the secret key, which is known only to the system operator, cannot be calculated from the public key. The RSA method is quoted as an example of an asymmetric encryption method.

If only the encrypted feature is transmitted to the terminal, it is necessary for the public keys of all system operators to be stored in the terminal or to be accessible via, for example, an Intranet connection, by all those who wish to use this terminal. In order to avoid this disadvantage, the public, specific key is stored in encrypted form in the card, according to a development of the invention, in which case a secret, global key was used for its encryption. This secret, global key is known, for example, only to central banks or other official institutions. Any public, specific key is used for the encryption. The unencrypted, public, specific key is also stored in the card.

Only the public, global key associated with the secret, global key is then contained in the terminal, by which the encrypted form of the public, specific key is decrypted and is compared with the original key, which is actually likewise stored. A match then shows that the correct secret, global key has been used for encryption of the public, specific key and certification, for example by the central bank, which thus guarantees that the public, specific key is correct, and can be used for decryption of the physical feature.

An antenna characteristic such as the Q-factor or else a combination of such characteristics may be used as a physical feature for non-contacting data media. Further options for physical features are quoted in European Patent EP 0 676 073 B1 and Published, European Patent Application EP 0 602 643 A2. There, an adjustable resistor network or the characteristics of an EEPROM cell are proposed as a card-specific, physical feature.

Other features which are considered as characteristic for the invention are set forth in the appended claims.

Although the invention is illustrated and described herein as embodied in a method for checking the authenticity of a data medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, block diagram of a smart card and a read/write terminal, as well a flowchart of a method according to the invention.

DESCRIPTION OF THE PREFERRED EMBODIMENTS

Referring now to the single FIGURE of the drawing in detail, there is shown a smart card 1 that has a physical feature X, as well as a memory 2 that may be, for example, in the form of a semiconductor chip.

Despite the description of the smart card 1, the invention is not in any way limited to such a configuration, but may be applied to any desired forms of data media.

The memory 2 contains at least a form $K_{s,s}[X]$ of the feature X encrypted using a first secret, specific key $K_{s,s}$. As is indicated by an enlargement of the memory 2 represented by dashed lines, the memory 2 may also contain, in a development of the invention, a second public, specific key $K_{s,p}$ as well as an encrypted form of the second key $K_{g,s}[K_{s,p}]$. A third secret, global key $K_{g,s}$ was used for encryption of the second key $K_{s,p}$.

A terminal 3 is illustrated, separated from the smart card 1 by a vertical, dashed line. The terminal 3 has an insertion slot 4 for the smart card 1, as well as a keyboard 5 and a display 6. The terminal 3 also has a memory 7, in which the second public, specific key $K_{s,p}$ is stored at least temporarily. On the one hand, the terminal 3 may store this key permanently or, alternatively, obtain it from a control center or from a data network for each authenticity check, via a data line. Since the second key $K_{s,p}$ is a specific key which is assigned to a specific system operator, for example to a credit card company, while, however, the terminal 3 may possibly be intended to be used for cards from various system operators, it would be necessary to store various second public, specific keys. Instead of this, in a development of the invention, a fourth public, global key $K_{g,p}$ can be stored, as is indicated by a dashed-line extension of the memory 7.

Both the smart card 1 and the terminal 3 may contain further devices, such as microprocessors or cryptoprocessors. The transmission from the smart card 1 to the terminal 3 may be made both by making contact or without making contact, for example via inductive coupling. The terminal 3 also has a measurement device 8 in order to allow it to determine the physical feature X of the smart card 1. The FIGURE does not show all these details, since they are already known from the prior art and do not contribute to the invention in detail.

Under the illustration of the smart card 1 and the terminal 3, the FIGURE shows the sequence of the method according to the invention. A development of the invention is shown between horizontal dashed lines, for the situation where the terminal 3 contains only one public, global key. In this case, in a method step d), the encrypted form of the second public, specific key $K_{g,s}[K_{s,p}]$ as well as the second public, specific key $K_{s,p}$ itself are transmitted from the smart card 1 to the terminal 3. The second public, specific key $K_{s,p}$ is calculated in the terminal 3 by use of the fourth public, global key $K_{g,p}$, and is compared in method step e) with the transmitted second public, specific key $K_{s,p}$. If no match is found, the method ends.

If a match is found, the encrypted form of the physical feature $K_{s,s}[X]$ is transmitted, in method step a), from the smart card 1 to the terminal 3, and the physical feature X itself is measured by the terminal 3. In the terminal 3, the encrypted physical feature $K_{s,s}[X]$ is then decrypted and compared with the measured feature X, by use of the previously transmitted, second public, specific key $K_{s,p}$, which has been identified as being correct.

If a match is found, the card is identified in method step c) as being authentic. If no match is found, the method ends.

When the method according to the invention is used, only the encrypted forms of the feature X and of the public specific key, as well as the public, specific key itself, need be stored in the smart card 1. The secret, specific key and the secret, global key need not be present in the smart card 1, but need be known only to the system operator or to the certifying location. However, since the secret keys are uniquely assigned to the associated public keys, it is impossible to simulate a card containing the correct encrypted forms of the data required for authenticity checking.

Even if a criminal misappropriates and analyses the terminal 3, this will not lead to the desired result, since only the public keys, and thus keys which can be obtained in some other way as well, are stored there. The secret, specific keys and the secret, global key may be contained not only in the data medium but also in the terminal, although this is not necessary, since this would lead to a loss of security.

We claim:

1. A method for checking authenticity of a data medium having at least one memory and a specific physical feature of the data medium being stored in encrypted form in the at least one memory, the specific physical feature being encrypted using a first specific, secret key, in addition, a second specific, public key associated with the first specific, secret key and a form of the second specific public key being encrypted using a third global, secret key, the method which comprises:

a) storing only the second specific, public key and the encrypted form of the second specific, public key in the data medium, without storing the first specific, secret key and the third global, secret key therein, and reading the second specific, public key and the encrypted second specific, public key from the data medium via a terminal;
   b) using a fourth global, public key, stored in the terminal, to calculate a test second key, and comparing the test second key with the second specific, public key previously read;
   c) carrying out method steps d) to f) if a match is found between the test second key and the second specific, public key and ending the method steps if no match is found;
   d) reading and measuring the encrypted form of the specific physical feature from the at least one memory of the data medium via the terminal resulting in a measured physical feature;
   e) using the second specific, public key to calculate a test physical feature via the terminal, and comparing the test physical feature with the measured physical feature; and
   f) confirming an authenticity of the data medium if the test physical feature matches the measured physical feature, and ending the method steps if the test physical feature does not match the measured physical feature.

2. A method for checking authenticity of a smart card having at least one memory and a specific physical feature of the smart card being stored in encrypted form in the at least one memory, the specific physical feature being encrypted using a first specific, secret key, in addition, a second specific, public key associated with the first specific, secret key and a form of the second specific public key being encrypted using a third global, secret key, the method which comprises:

a) storing only the second specific, public key and the encrypted form of the second specific, public key in the in the smart card, without storing the first specific, secret key and the third global, secret key therein, and reading the second specific, public key and the encrypted second specific, public key from the smart card via a terminal;
   b) using a fourth global, public key, stored in the terminal, to calculate a test second key, and comparing the test second key with the second specific, public key previously read;
   c) carrying out method steps d) to f) if a match is found between the test second key and the second specific, public key and ending the method steps if no match is found;
   d) reading and measuring the encrypted form of the specific physical feature from the at least one memory of the smart card via the terminal resulting in a measured physical feature;
   e) using the second specific, public key to calculate a test physical feature via the terminal, and comparing the test physical feature with the measured physical feature; and
   f) confirming an authenticity of the smart card if the test physical feature matches the measured physical feature, and ending the method steps if the test physical feature does not match the measured physical feature.

* * * * *